Sept. 29, 1970 W. D. DOYLE ET AL 3,531,783

MULTILAYER MAGNETIC WIRE MEMORY

Filed Aug. 9, 1965

*INVENTORS*
WILLIAM D. DOYLE
NORMAN GOLDBERG

*BY* Fred Fisher

*ATTORNEY*

3,531,783

MULTILAYER MAGNETIC WIRE MEMORY

William D. Doyle, Dresher, and Norman Goldberg, Ambler, Pa., assignors to Sperry Rand Corporation, New York, N.Y., a corporation of Delaware Filed Aug. 9, 1965, Ser. No. 478,340
Int. Cl. B23p *3/20*; C23b *5/50*; G11c *11/14*
U.S. Cl. 340—174 11 Claims

ABSTRACT OF THE DISCLOSURE

A multilayer film memory is disclosed which utilizes two films wherein one film has a large anisotropy field, $H_k$, whereas the second has a small anisotropy field. The two magnetic films are separated by a film of non-magnetic material. During the interrogation mode, a HARD axis field applied to the films causes the magnetization of the small $H_k$ film to rotate through a relatively large angle removed from the EASY axis whereas the large $H_k$ film rotates through only a small angle. In view of the exchange coupling between the films in view of the intermediate non-magnetic layer, the large $H_k$ film brings the small $H_k$ film back to its original direction thereby enabling the memory to operate at low currents and make it less susceptible to creep (i.e., domain wall movement).

This invention relates to wire for use in magnetic memories and, in particular, to multilayer wire magnetic memory elements.

Magnetic memories utilizing wires having a thin layer of magnetic film deposited about its circumference, have existed in the prior art. Magnetic matrices can be created using such single layer thin film memory wire in conjunction with orthogonally oriented word straps. The intersections of the word straps with the magnetically plated wires represent individual bit locations. Hence, it is possible to represent large numbers of bit locations with a high plurality of intersections. Thus, it is believed that magnetic film wire memories are practical for large scale inexpensive film memories. The orientation of magnetic wire with word straps should be densely packed in practical memories in order to obtain the highest bit per area ratio, and thereby obtain the highest amount of memory storage for a given space or volume, because it is desired that memories be limited in size for practical purposes.

When magnetic films are closely packed, the interaction between neighboring films become sufficiently large to cause magnetic domain walls in the film to move (this phenomenon is terms "creep"), so that information can be lost. The phenomenon of creep and the associated phenomenon of dispersion of the easy axis are complicated. For example, it is known that the induced magnetic anisotropy field varies in magnitude as well as in direction from region to region.

Efforts to predict the response of the local magnetization to an applied field by using a model which treats these regions as independent have generally failed. The reason for the failure is believed to be that these regions interact strongly with their neighbors by way of magnetostatic and exchange interactions as well as by way of conduction electrons.

The term "coupled film" is applied to a pair of magnetic films which are separated by a film of non-magnetic material, which magnetic films behave co-operatively because they are coupled together by magnetostatic or conduction electron interactions. Coupled films can be made with intermediate metal layers of 100 to 300 angstroms in thickness. The coupling film structure can be used as a memory device as follows: when one of the films has a large anisotropy field $H_k$ and the other film has a small anisotropy field $H_k$, it is possible to interrogate the small $H_k$ film by a field in the hard direction without changing the orientation of the other significantly. The large $H_k$ film rotates through only a small angle, and it will bring the small $H_k$ film back to its original direction when the hard direction field is removed because of the coupling between them.

When a metallic interfacial layer is less than a certain critical thickness, a strong interaction occurs which acts to keep the magnetization of the films parallel. Since magnetostatic fields favor an antiparallel arrangement, the coupling is believed to be by way of an exchange interaction. The critical thickness varies from 100 angstroms for gold to approximately 400 angstroms for silver. When the interfacial layer is an insulator rather than a metal, this kind of coupling disappears. Because of the dependence of the interaction on the conductivity of the interfacial layer, this effect is believed to be due to the existance of polarized conduction electrons. The *d* electrons at the Fermi level of one of the magnetic films are preferentially aligned in one direction. The electrons are also the conduction electrons and can freely diffuse into the intermediate nonmagnetic, metallic layer. When this layer is thin enough and the spin-flip scattering is small enough, the electrons that diffuse into the other magnetic layer are still polarized. The exchange interaction tends to align the *d* electrons of the second magnetic film parallel to the electrons from the first film.

It is, therefore, an object of this invention to provide a novel multilayer cylindrical wire memory element.

Still another object of this invention is to devise a cylindrical multilayer element which is insensitive to stray fields.

Yet another object of this invention is to provide a novel magnetic memory element which can reliably operate at low current levels and is insusceptible to creep.

In accordance with one embodiment of this invention, a multilayer magnetic wire is constructed with an internal conductor of electrically conductive non-magnetic material which is concentrically coated with a first inner film, which inner film is of magnetic material having its easy axis of anisotropy circumferential about the conductor. A second, intermediate, film of electrically conductive non-magnetic material is coated about the first film. A third outer film, circumferentially coated thereon, is of magnetic material and has its easy axis of anistropy circumferential about the conductor. The anisotropy field $H_k$, of the two magnetic films are not equal. The intermediate film is less than the critical amount so that the films are coupled.

Other objects and advantages of this invention, together with its construction and mode of operation, will become more apparent from the following description when read in conjunction with the accompanying drawing, in which.

Figure 1:
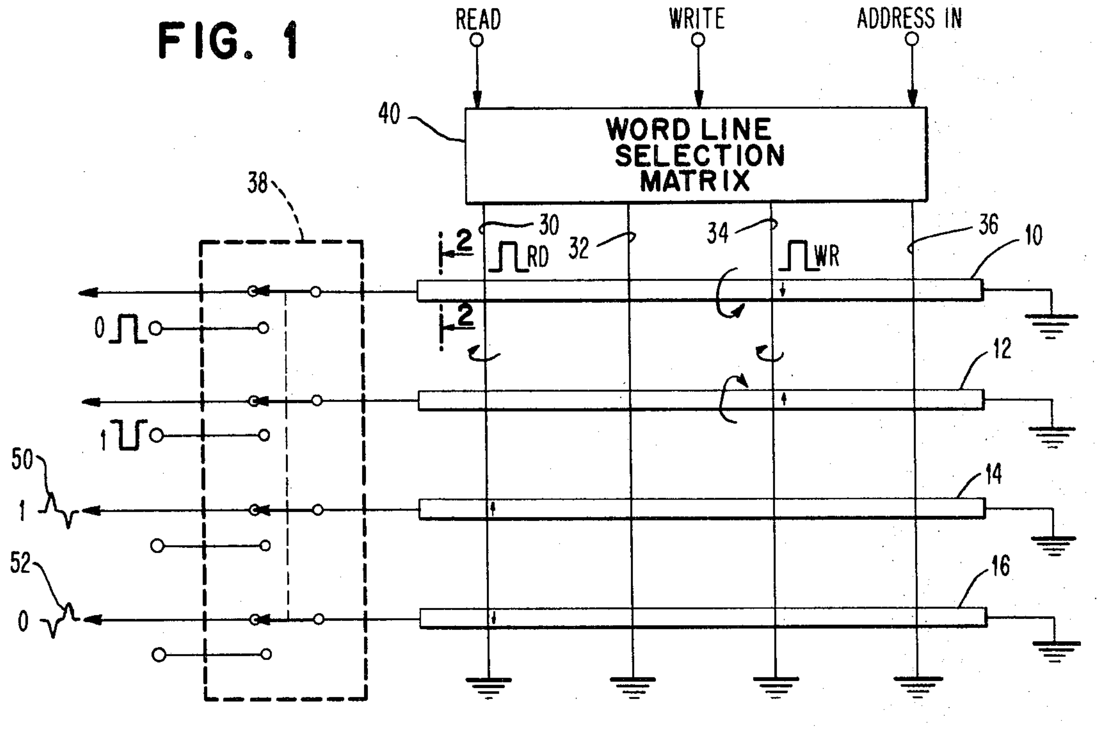
FIG. 1 is a block diagram of a memory matrix utilizing the novel multilayer wire described hereinafter.
Figure 2:
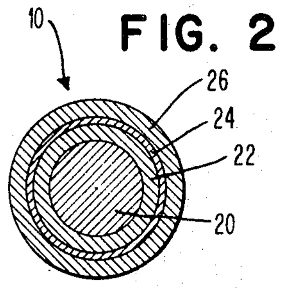
FIG. 2 is a cross-sectional view of the magnetic wire taken along the line 2—2 of FIG. 1.

Referring to FIG. 1, there is shown a plurality of multilayer magnetic wires 10, 12, 14, 16 which are arranged in an orthogonal relation with separate word straps 30, 32, 34, 36. Signals to be written into, and signals to be read from, the individual magnetically plated wires 10, 12, 14, 16 are coupled to one of their ends by means of a suitable switch circuit 38. The other ends of the magnetically plated wires 10, 12, 14 and 16 couple to a point of reference potential, such as ground. The individual word straps 30, 32, 34, 36 are coupled at one end thereof to receive an address signal by means of a suitable word line selection matrix 40, which matrix selectively receives individual read and write signals. The other ends of the word straps 30, 32, 34, 36 are coupled to a point of reference potential, such as ground.

Each of the multilayer magnetic wires 10, 12, 14, 16 comprises a central conductor 20 upon which is deposited thereon a magnetic film 22 circumferentially and concentrically thereon. Concentrically and circumferentially located about the film 22 is a non-magnetic electrical conductor 24 such as gold, silver, and the like. Circumferentially and concentrically deposited thereon is a second magnetic layer 26.

One of the magnetic films 22, 26 has a low coercive force and is constructed from an alloy, such as nickel and iron. The other of the films 26, 22 has a relatively high coercive force and is, for example, constructed of an alloy of nickel, iron, and cobalt.

The electrically conductive non-magnetic film 24 is very thin, for example, 100 angstroms for gold, 400 angstroms for silver, so that the exchange interaction phenomenon can take place so that the films are considered to be coupled, that is, the magnetization of the films to be parallel. Since it is desired that the multilayer magnetic wire comprise a relatively thick (for example, 10,000 angstroms), low coercive force (such as 2 oersteds) film, a thin (less than 500 angstroms) interfacial non-magnetic metallic layer, a final thick high coercive force (approximately 10 oersteds) layer, such a device is highly useful over corresponding planar elements because the novel device has a higher creep threshold, since thick films have a much higher creep threshold than thin films. In addition, the coupling phenomena which have been observed to reduce creep in thin films should occur as well for a metallic interface as for an insulating one since they are magnetostatic in orgin. Even though the domain walls of thick films are different from those of thin films, one still expects that a magnetic interaction between walls in the two layers will reduce creep for thick films also. The thick coupled films, described herein, thus have inherently high creep thresholds. Thus, the geometry of a cylindrical wire provides for superior creep properties.

Referring to FIG. 1, the quiescent magnetic state of a magnetic wire 10, 12, 14, and 16 beneath the word straps 30, 32, 34, and 36 can be placed in either a counter-clockwise, as viewed toward the right, direction which, arbitrarily, represents a 1, or in a clockwise, as viewed towards the right, direction which, arbitrarily, represents a 0.

Figure 3:
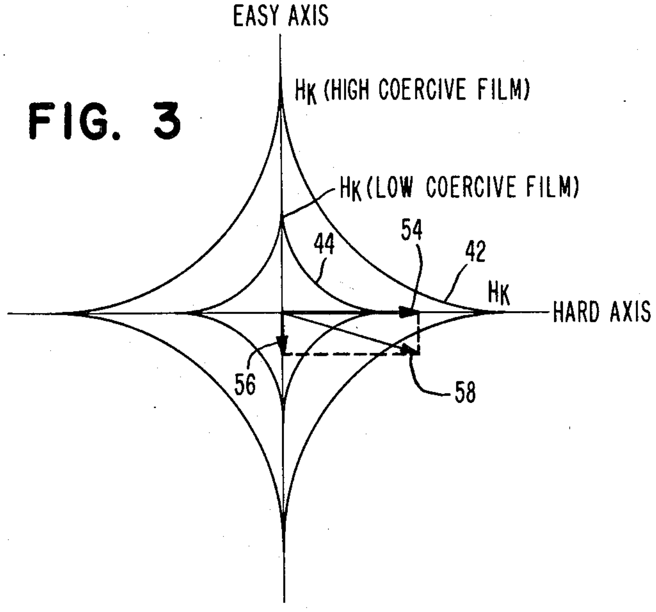
FIG. 3 is an asteroid diagram, illustrating the magnetic characteristics of the coupled films of the multilayer wire.

In a reading operation, referring to the figures, the application of a positive read-out pulse in the word strap line 30 causes a signal to be induced or read out on the line 14 indicative of a "1" in a non-destructive manner, as follows: Referring to FIG. 3, the magnetic state of the element at the intersection of the word line 30 with the plated wire 14 is in a counter-clockwise direction. The application of a positive read pulse on the word line 30 is sufficient to provide a magnetic field H, as illustrated by the vector 54, which is greater than the $H_k$ for the low coercive film but less than the $H_k$ for the high coercive film. Thus, the vector 54 lies outside of the asteroid 44 but within the asteroid 42. The asteroid 42 represents the magnetic characteristics for the high coercive film while the asteroid 44 represents the characteristics for the low coercive film. The asteroids 42 and 44 are, mathematically, the graphical representations $H_x^{2/3}+H_y^{2/3}=H_k^{2/3}$. Magnetic fields which fall within the asteroid will not cause a switching of the magnetization, while magnetic fields large enough to terminate outside the asteroid can switch the magnetization. The read electrical pulse RD on the word line 30, creating a vectorial magnetic field 54, as shown in FIG. 3, causes the magnetic state for the low coercive film to orient itself, in the hard direction, towards the right as viewed in FIG. 1; however, the magnetic state for the high coercive film remains, substantially, in the counter-clockwise direction, having rotated only through a small negligible angle. Upon removal of the read pulse RD, the magnetic state of the low coercive film is rotated back to its original direction because of the coupling between the two films.

The turning of the magnetic vector on the multilayer wire 14 from a circumferential direction to the right-hand axial position induces a voltage which causes current to flow towards the left, in a manner so as to oppose the turning of the vector, in accordance with Lenz's Law. Upon removal of the pulse RD on the word strap 30, the vector returns to its circumferential position, and current flows towards the right in accordance with Lenz's Law. Hence, an output waveform 50, a positive pulse followed by a negative pulse, is produced. The waveform 50 is indicative of a "1" readout from the bit position.

In a similar manner, the application of a read pulse on the word line 30 to the magnetic wire 16 (which stores a "0" at that bit position, for example) causes a signal to be produced, as illustrated by the waveform 52, which is representative of a 0 at the juxtaposition of the wire 16 with the strap 30. The element at the juxtaposition of the wire 16 with the strap 30 is representative of 0, as indicated by the arrow pointed in a downward direction. The application of a positive pulse on the word strap 30 causes the magnetic vector for the low coercive film (representing 0) to orient itself to the right-hand direction, axial with respect to the wire 16, and upon removal of the pulse RD from the word strap 30, the direction of magnetization for that element resumes its original circumferential downward direction. In this manner, as before, the pulse RD on the word strap line 30 produces a magnetic vector 54 which is greater than the magnetic field required to switch the low coercive film into the hard direction, but is less than that required to switch the hard coercive film into the hard direction. Thus, as before, the vector 54 is outside the asteroid 44 but within the asteroid 42. The application of the pulse RD on the word strap 30 which causes the vector for a 0 to rotate towards the right, as viewed in FIG. 1, causes current to flow in the wire 16 towards the right (in the direction to oppose the vector rotation), and upon removal of the pulse from the word line 30, which causes the vector to resume its original downward circumferential direction, current flows towards the left (in accordance with Lenz's Law). Hence, the waveform 52 is produced, a negative pulse followed by a positive pulse, for a 0, the opposite connotation for a 1 as described hereinabove.

It is noted that the application of a read pulse RD on the word line 30 does not destroy the information recorded in the wires 10, 12, 14, 16. Hence, nondestructive readout is obtained.

In a writing mode of operation, a write pulse WR on the line 34, for example, is of sufficient magnitude to produce the vector 54 as described hereinabove. The writeout pulse WR, hence, can be of the same magnitude as the read pulse RD. The write pulse WR, desirably, produces a greater field than the anisotropy field $H_k$ for the low coercive film and less than the anisotropy field $H_k$ for the high coercive film. Coincidentally, with the application of the write pulse WR on the word strap 34, a positive or negative pulse is applied to the individual bit lines 10, 12, 14, 16 indicative of a 0 or a 1, respectively, to be written in thereto. In the embodiment described, the application of a positive pulse, indicating a 0, to the bit line 10 causes a magnetic vector 56 to be applied thereto in a downward direction (FIG. 3). The magnetic vector 56, by itself, is insufficient to switch the film 22 or 26 since it lies within the both asteroids. Film switching occurs only when the magnetic vector lies outside its asteroid. Hence, the positive ("zero") pulse applied to the bit line 10 provides a magnetic vector 56 in a downward direction (clockwise as viewed toward the right, FIG. 1), and, by itself is insufficient to switch the films (either the low coercive film or the high coercive film) underneath the word straps 30, 32, or 36. However, the magnetic vector 56, in co-operation with the magnetic vector 54 which is produced by the pulse applied to the word strap 34, provides a resultant vector 58 which lies outside the outer asteroid 42 in a downward direction. This resultant vector 58, lying outside the asteroid 42, is sufficient to switch the film to respresent a 0. Upon removal of the pulses WR on the line 34 and the pulse on the bit line 10, the magnetic state of the film at the cross-over of the wire 10 with the word strap 34 becomes oriented in a clockwise direction to represent a 0, reverting to its easy circumferential axis.

In a similar manner, the application of a negative pulse to the multiplated wire 12 causes a magnetic field to be generated in a counter-clockwise direction (as viewed towards the right) to provide a corresponding upward magnetic vector, opposite to the vector 56 illustrated in FIG. 3. This upward vector is insufficient to change the magnetic states of the plated wire 12 underneath the straps 30, 32, and 36; however, such vector in co-operation with the vector 54 (generated by the write pulse WR) provides a resultant lying outside the asteroid 42 in the upward direction. Hence, the resultant is sufficient to rotate or switch the film to the 1 state.

Thus, there has been described, a multi-layer cylindrical film memory utilizing a conductive cylindrical substrate having circumferentially and concentrically deposited thereon a low coercive film and a high coercive film, separated by a thin nonmagnetic metallic film. Thus, the memory reliably operates at low currents, and is less susceptible to creep. The small $H_k$ film is interrogated by a field large enough to rotate the small $H_k$ film but not large enough to cause a significant rotation of the large $H_k$ film. The small $H_k$ film is pulled back into its original direction by the large $H_k$ film when the interrogating field is removed.

The interfacial layer, described, can be gold, in the neighborhood of 100 angstroms thickness; silver, approximately 400 angstroms; and chromium, less than 500 angstroms.

Many variations will present themselves to those skilled in the art. It is desired that this invention be limited solely by the scope of the allowed claims. Various configurations, within the scope of this invention, will present themselves, such as multilayer films having greater number of layers than described herein.

The embodiments of the invention in which an exclusive property or privilege is claimed are defined as follows:

1. In combination, a multilayer magnetic wire comprising an inner conductor concentrically coated with an inner film having an easy axis of magnetization, an intermediate film, and an outer film having an easy axis of magnetization, the anisotropy field, $H_k$, of said inner and outer films being unequal, means for energizing said magnetic wire such that the magnetization of one film is rotated through a larger angle than the magnetization of the outer film.

2. In combination, a multilayer magnetic wire comprising an inner conductor concentrically coated with an inner film of magnetic material and having an easy axis of magnetization, an intermediate film of non-magnetic material, and an outer film of magnetic material having an easy axis of magnetization, said inner and outer films having an easy axis which is circumferential and said inner and outer films further having an anisotropy field, $H_k$, which is unequal, means for energizing said magnetic wire such that the magnetization of one film is rotated through a larger angle than the magnetization of the outer film.

3. In combination, a multilayer magnetic wire comprising an inner conductor concentrically coated with a first inner film of magnetic material having its easy direction of anisotropy circumferential about said conductor, a second intermediate film of electrically conductive non-magnetic material, and a third outer film of magnetic material having its easy axis of anisotropy circumferential about said conductor, said first and third films having an unequal coercive force, $H_c$.

4. In combination, a multilayer magnetic wire comprising an inner conductor of electrically conductive non-magnetic material concentrically coated with a first inner film of magnetic material having a coercive force $H_1$ and having its easy axis of anisotropy circumferential about said conductor, a second intermediate film of electrically conductive non-magnetic material, and a third outer film of magnetic material having a coercive force $H_2$ and having its easy axis of anisotropy circumferential about said conductor, and wherein $H_1 \neq H_2$.

5. The combination as claimed in claim 4 wherein said first and third films are each relatively thick and said second film is relatively thin.

6. The combination as claimed in claim 4 wherein said first film has a thickness of 10,000 angstroms, said second film has a thickness of 100 angstroms, and said third film has a thickness of 10,000 angstroms.

7. The combination as claimed in claim 4 wherein said second film is gold.

8. The combination as claimed in claim 4 wherein one of said magnetic films consists of an iron-nickel alloy, and the other of said magnetic films consists of an iron-nickel-cobalt alloy.

9. The combination as claimed in claim 8 wherein said second film is gold.

10. In combination, a multilayer magnetic wire comprising an inner electrically conductive, non-magnetic, conductor concentrically coated with a first inner film, having a 10,000 angstroms thickness, of magnetic material with a coercive force $H_1$, having its easy axis of anisotropy circumferential about said conductor, a second intermediate gold film having a 100 angstroms thickness, and a third outer film, having a 10,000 angstroms thickness, of magnetic material with a coercive force $H_2$, having its easy axis of anisotropy circumferential about said conductor, wherein $H_1 \neq H_2$.

11. The combination in accordance with claim 4 wherein a field is applied during an interrogation mode perpendicular to said easy axis and whose magnitude is such as to rotate the magnetization of the film having the lowest H through a larger angle than the magnetization of the film having the higher H.

References Cited

UNITED STATES PATENTS

| | | | |
|---|---|---|---|
| 3,213,431 | 10/1965 | Kolk et al. | 340—174 |
| 3,375,091 | 3/1968 | Feldtkeller | 29—199 X |
| 3,370,979 | 2/1968 | Schmeckenbecher | 117—217 |
| 3,451,793 | 6/1969 | Matsushita | 29—194 |

JAMES W. MOFFITT, Primary Examiner

U.S. Cl. X.R.

29—194, 196, 196.6, 199; 117—128, 235; 204—23, 40